United States Patent [19]

Noso et al.

[11] Patent Number: 4,637,045
[45] Date of Patent: Jan. 13, 1987

[54] SPEECH RECOGNITION SYSTEM FOR AN AUTOMOTIVE VEHICLE

[75] Inventors: Kazunori Noso, Yokosuka; Norimasa Kishi, Yokohama; Toru Futami, Yokosuka, all of Japan

[73] Assignee: Nissan Motor Company, Japan

[21] Appl. No.: 809,882

[22] Filed: Dec. 17, 1985

Related U.S. Application Data

[63] Continuation of Ser. No. 428,231, Sep. 29, 1982, abandoned.

[30] Foreign Application Priority Data

Oct. 22, 1981 [JP] Japan ................... 56-167948

[51] Int. Cl.$^4$ ............................................. G10L 5/00
[52] U.S. Cl. ............................................. 381/43
[58] Field of Search ............................ 381/41–43; 364/513.5

[56] References Cited

U.S. PATENT DOCUMENTS

| | | | |
|---|---|---|---|
| 3,541,259 | 11/1970 | Gilmour | 381/43 |
| 4,181,821 | 1/1980 | Pirz et al. | 381/43 |
| 4,450,545 | 5/1984 | Kishi et al. | 381/42 |
| 4,479,197 | 10/1984 | Haag et al. | 364/900 |

*Primary Examiner*—E. S. Matt Kemeny
*Attorney, Agent, or Firm*—Lowe, Price, LeBlanc, Becker & Shur

[57] ABSTRACT

A speech recognition system for an automotive vehicle enables desired reference spoken instruction phrases to be easily re-recorded by repeatedly depressing a manual switch arrangement that commands skipping. Each activation of the switch shifts the system from a ready state for recording the current spoken instruction to a ready state for recording a succeeding spoken instruction. By repeatedly activating the skip switch ready state for re-recording any given spoken instruction is reached. In one embodiment, a separate skip switch is provided. In a second embodiment, logic circuitry responds to simultaneous activation of record and recognition switches to command skipping.

13 Claims, 7 Drawing Figures

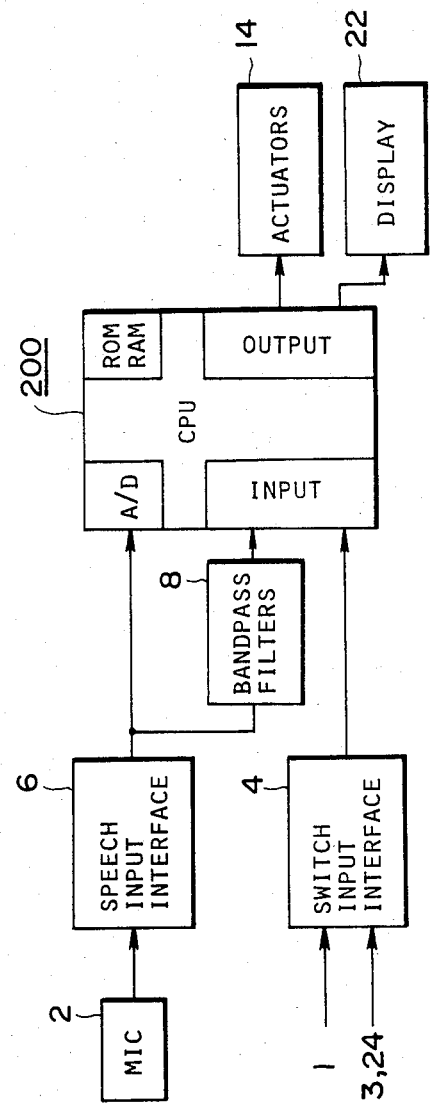

SPEECH RECOGNITION SYSTEM FOR AN AUTOMOTIVE VEHICLE

This application is a continuation of application Ser. No. 428,231, filed Sept. 29, 1982, now abandoned.

BACKGROUND OF THE INVENTION

1. Field of the Invention

The present invention relates generally to a speech recognition system for an automotive vehicle, and more specifically to a reference spoken-instruction recording section in the system for recording a plurality of reference spoken instruction phrases in a predetermined sequence.

2. Description of the Prior Art

A well-known speech recognizer energizes various actuators in response to human spoken instructions. When this speech recognizer is mounted on an automotive vehicle, the headlight, for instance, can be turned on or off in response to a driver's spoken instruction such as "Headlight on" or "Headlight off". The speech recognizer is very convenient because various spoken instructions can be recognized in order to control various actuators, without depressing switches; however, there are some problems involved in applying this system to an automotive vehicle.

Before utilizing the speech recognizer, the driver must first record a plurality of reference spoken instructions in the speech recognizer. When recording these instructions, it is the usual practice to automatically, sequentially record the reference spoken instructions by sequentially uttering a plurality of phrases in accordance with indications displayed on an appropriate display unit while depressing a record switch. In this case, however, since there is a predetermined order of spoken instructions which controls the sequential energization of the actuators in response to the spoken instructions, it is impossible to record only desired instructions freely. In other words, the driver can record a succeeding instruction only after a predetermined preceding instruction has been recorded. Therefore, if the noise level in the passenger compartment rises to an abnormally high level or if the driver cannot record an instruction perfectly, the driver must record all the spoken instructions again beginning from the first instruction. This is because it is impossible to record only a desired instruction freely. Thus, the recording process is cumbersome without use of some instructions already recorded in good condition.

A more detailed description of a typical speech recognizer and a prior-art spoken instruction recording section is made infra with reference to the attached drawings in conjunction with the present invention under DETAILED DESCRIPTION OF THE PREFERRED EMBODIMENTS.

SUMMARY OF THE INVENTION

With these problems in mind therefore, it is the primary object of the present invention to provide a speech recognition system for an automotive vehicle in which any desired reference spoken instruction can be readily recorded in the system by depressing a skip switch repeatedly and by uttering the desired instruction again, without repeating all the reference spoken instructions again in the predetermined sequence.

To achieve the above mentioned object, the speech recognition system according to the present invention comprises a switch arrangement in addition to the conventional speech recognizer for an automotive vehicle. When the skip arrangement is activated, a skip signal is generated to shift the recorder from a state ready for recording a current spoken instruction to a state ready for recording a succeeding spoken instruction. In one embodiment, a single skip switch controls derivation of the skip signal. In a second embodiment, simultaneous activation of record and recognition switches causes logic circuitry to derive the skip signal. The logic circuitry includes a latch circuit and two AND gates.

BRIEF DESCRIPTION OF THE DRAWINGS

The features and advantages of the speech recognition controlled system for an automotive vehicle according to the present invention will be more clearly appreciated from the following description taken in conjunction with the accompanying drawings in which like reference numerals designate corresponding elements or sections throughout the drawings and in which;

FIG. 7 is a schematic block diagram of a third embodiment of the speech recognition system according to the present invention, in which a microcomputer is included.

DETAILED DESCRIPTION OF THE PREFERRED EMBODIMENTS

Figure 1:
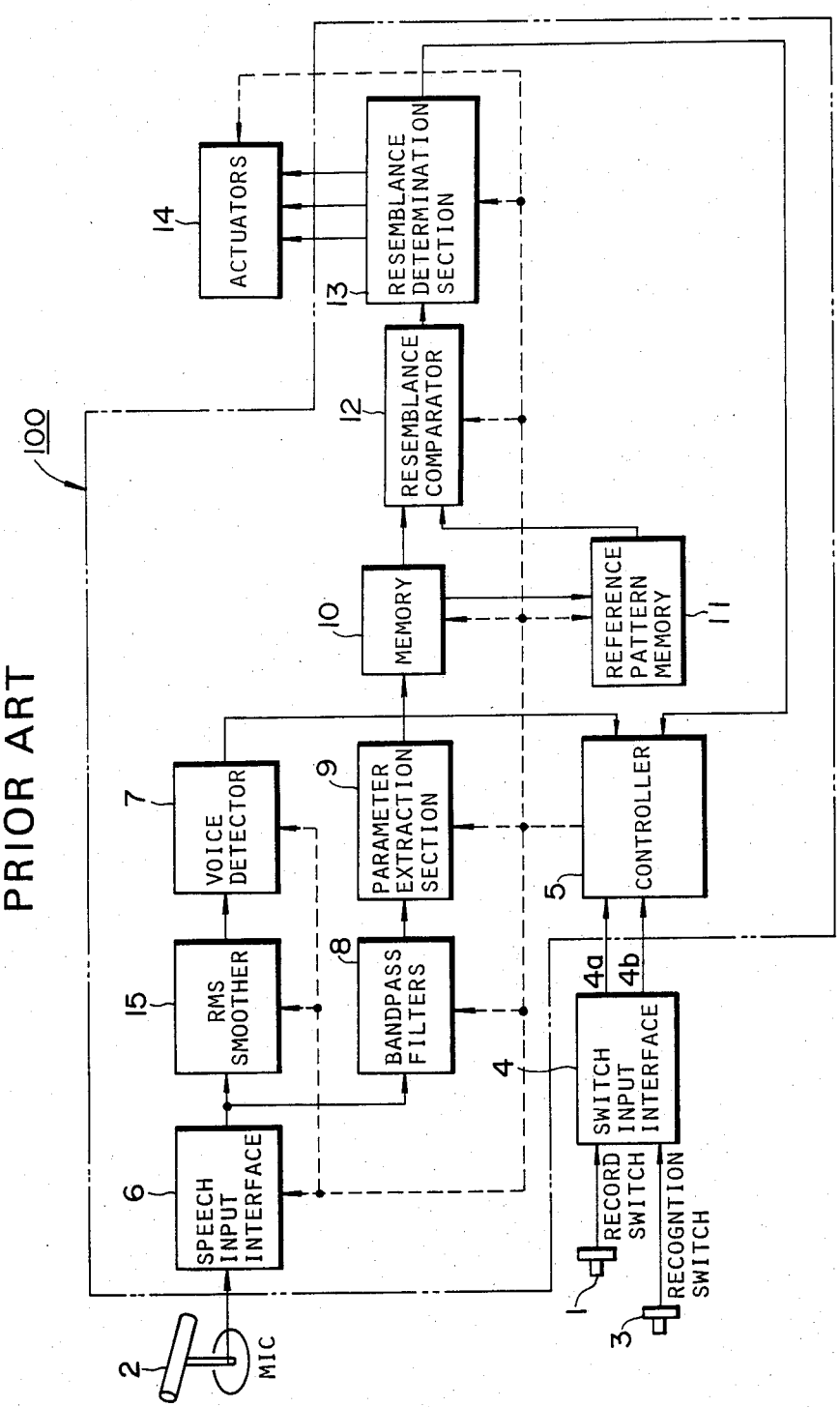
FIG. 1 is a schematic block diagram of a typical prior art speech recognizer for assistance in describing the operations thereof.

To facilitate understanding of the present invention, brief reference is made to the construction and operation of a typical prior-art speech recognizer, with reference to FIG. 1.

FIG. 1 is a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and supplies a signal to a controller 5 via a wire 4a. In response to the signal on wire 4a, the controller 5 supplies a recording mode command signal to other sections; the recording mode command signal presets the entire speech recognizer to the recording mode. In the spoken instruction recording mode, when the user says a phrase to be used as a spoken instruction, such as "open doors", near a microphone 2, the spoken phrase is transduced into a corresponding electric signal by the microphone 2. The signal is amplified by a speech input interface 6 including a spectrum-normalizing amplifier; the output of interface 6 is smoothed by a root-mean-square (RMS) smoother 15, including a rectifier and a smoother, which drives voice detector 7. Voice detector 7 detects whether or not the magnitude of the spoken phrase signals exceeds a predetermined level for a predetermined period of time (150 to 250 ms) to determine the start of the spoken phrase input signals. Detector 7 determines whether or not the magnitude of the signals from smoother 15 drops below a predetermined level for a predetermined period of time to determine the end of the spoken phrase signals. When detector 7 senses the start of the spoken phrase signals, it supplies another recording mode command signal to the controller 5. In response to this command signal from detector 7, the controller 5 enables a group of bandpass filters 8 to respond to the output of interface 6 to divide the spoken phrase signal from the microphone 2 into a number of predetermined frequency bands. Parameter extraction section 9 squares or rectifies the frequency-divided spoken phrase signals derived from filters 8 to derive the voice power spectrum for each of the frequency bands. Section 9 converts the power spectrum for each of the frequency bands into corresponding digital time-series matrix-phonetic pattern data (explained later). These data are then stored in a memory unit 10. In this case, however, since the speech recognizer is set to the spoken instruction recording mode by depressing record switch 1, the time-series matrix-phonetic pattern data are transferred to a reference pattern memory unit 11 and stored therein as reference data for use in recognizing the speech instructions.

After the reference spoken instructions have been recorded, the user can supply speech instructions, such as "open doors", to the speech recognizer through the microphone 2 while depressing a recognition switch 3.

Switch input interface 4 detects the depression of the recognition switch 3 and supplies a signal to the controller 5 via a wire 4b. In response to the signal on wire 4b, the controller 5 supplies a recognition mode command signal to other sections to preset the entire speech recognizer to the recognition mode. In this spoken phrase recognition mode, when microphone 2 picks up an instruction phrase similar to the phrase recorded previously and when the voice detector 7 derives a signal, the spoken instruction is transduced into a corresponding electric signal by microphone 2, thence is amplified by the speech input interface 6, thence filtered and divided into voice power spectra across the frequency bands by bandpass filters 8. The outputs of filters 8 are squared or recitifed and further converted into corresponding digital time-series matrix-phonetic pattern data by the parameter extraction section 9. The pattern is then stored in the memory unit 10, in the same manner as in the recording mode.

Next, the time-series matrix-phonetic pattern data stored in the memory unit 10 in the recognition mode are sequentially compared in resemblance comparator 12 with the time-series matrix-phonetic pattern data stored in the reference pattern memory unit 11; the phonetic pattern data were stored in unit 11 during the recording mode. The resemblance comparator 12 calculates the level of correlation of the speech instruction signal supplied to the reference speech instruction. The speech instruction signal supplied to comparator 12 is time and level normalized to compensate for variable speaking amplitudes and rates that occur because the same person might speak quickly and loudly at one time but slowly and softly at some other time. The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is supplied to a resemblance determination section 13 to determine whether or not the calculated values lie within a predetermined range, that is, to evaluate the value of the calculated cross-correlation. If the calculated cross-correlation is within the range, a command signal, indicating that a recognition-mode spoken instruction having adequate resemblance to one of the recorded instruction phrases, is supplied to one of automotive actuators 14; one of actuators 14 may cause the vehicle doors to open, for instance. The above-mentioned operations are all executed in accordance with command signals derived from the controller 5.

Description has been made hereinabove of the case where the speech recognizer 100 comprises various discrete elements or sections; however, it is of course possible to embody the speech recognizer 100 as a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 are all incorporated in the microcomputer to execute the same or similar processes, calculations and/or operations as explained hereinabove.

Exemplary digital time-series matrix-phonetic pattern data and the Tchebycheff distance are now described.

In the case where the number of the bandpass filters is four and there are 32 time-series increments for each filter, the digital recording-mode time-series matrix-phonetic pattern data can be expressed as $$F(A) = f(i,j) = f(1,1), f(1,2), f(1,3) \ldots, f(1,32)$$
$$f(2,1), f(2,2), f(2,3) \ldots, f(2,32)$$
$$f(3,1), f(3,2), f(3,3) \ldots, f(3,32)$$
$$f(4,1), f(4,2), f(4,3) \ldots, f(4,32)$$

where A designates a first recording-mode speech instruction (reference) (e.g. OPEN DOORS), i denotes the filter index, and j denotes time-series increment index.

If a first recognition-mode speech instruction (e.g. OPEN DOORS) is denoted by the character "B", the Tchebycheff distance is obtained from the following expression:

$$l = |F(A) - F(B)| = \sum_{i=1}^{4} \sum_{j=1}^{32} |f^A(i,j) - f^B(i,j)|$$

In view of the above description and with reference to the attached drawings, the background and the embodiments of the present invention will be described hereinafter.

Figure 2:
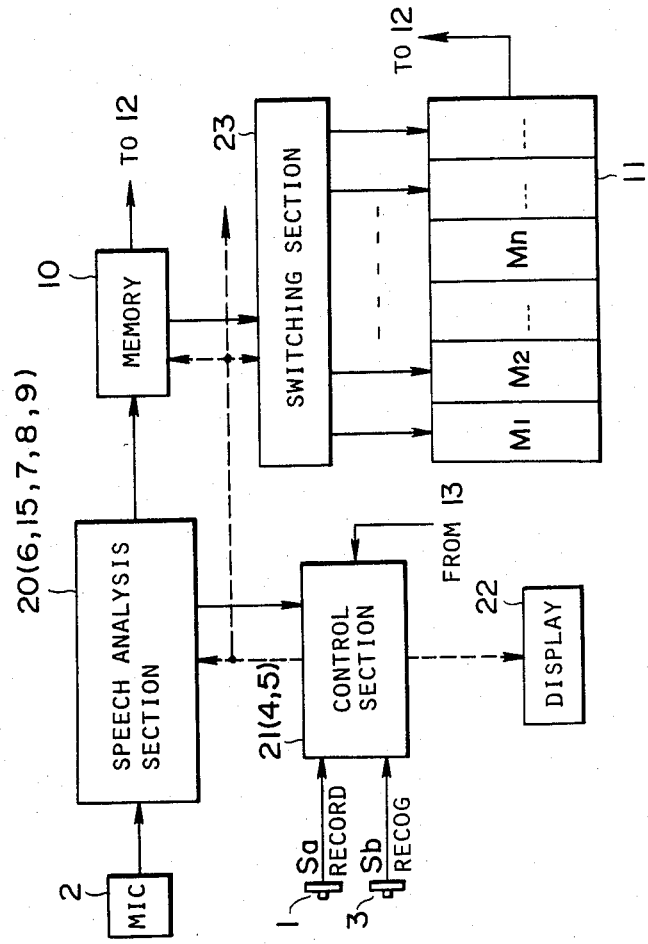
FIG. 2 is a fragmentary schematic block diagram of an essential portion of a prior-art automotive vehicle speech recognition system.

A typical prior-art speech recognition system for an automotive vehicle, as illustrated in FIG. 2, includes a speech analysis section 20 including speech input interface 6, RMS smoother 15, voice detector 7, bandpass filters 8, and parameter extraction section 9 all described supra in connection with FIG. 1. Control section 21 includes switch input interface 4 and the controller 5, as shown in FIG. 1. Display unit 22 displays in a predetermined sequence, plural spoken instruction phrases, in letter or appropriate picture form. Reference pattern memory unit 11, as shown in FIG. 1, includes respective storage areas $M_1$, $M_2$, $M_3$ ... $M_n$ ..., each assigned to the respective spoken instruction phrases. Switching section 23 is accessible to each of the storage areas in response to a command signal derived from the control section 21.

The operations for recording a plurality of spoken instructions in predetermined sequence in the speech recognition system shown in FIG. 2 are explained infra.

When the driver depresses the record switch 1, a record signal Sa is generated. In response to record signal Sa, the control section 21 supplies a command signal to display unit 22, speech analysis section 20, and switching section 23. In response to this command signal, a first spoken instruction to be recorded is indicated on the display unit 22; a first storage area $M_1$ assigned for the first spoken instruction is connected to the memory unit 10 via the switching section 23; and the speech analysis section 20 is enabled for analyzing and recording the first spoken instruction expected to be uttered by the driver to microphone 2. Under these conditions, the first spoken instruction uttered by the driver and transduced by microphone 2 is analyzed by speech analysis section 20 and stored in the storage area $M_1$ through the memory unit 10 and the switching section 23.

After the first spoken instruction has been stored as described above, the control section 21 supplies the same command signal to each section in the same way as described above. In response to the command signal, a second spoken instruction is indicated on the display unit 22; a second storage area $M_2$ is connected to the memory unit 10 via the switching section 23; and the speech analysis section 20 is enabled to analyze and record the second spoken instruction. Under these conditions, when the driver utters the second spoken instruction, the second spoken instruction is analyzed and stored in storage area $M_2$. Similarly, the remaining spoken instructions are all recorded in the assigned stored areas $M_n$ in a predetermined sequence. In short, the driver sequentially records plural spoken instructions by uttering spoken instructions in a predetermined recording sequence while depressing the record switch 1 and watching the display unit 22.

Figure 3:
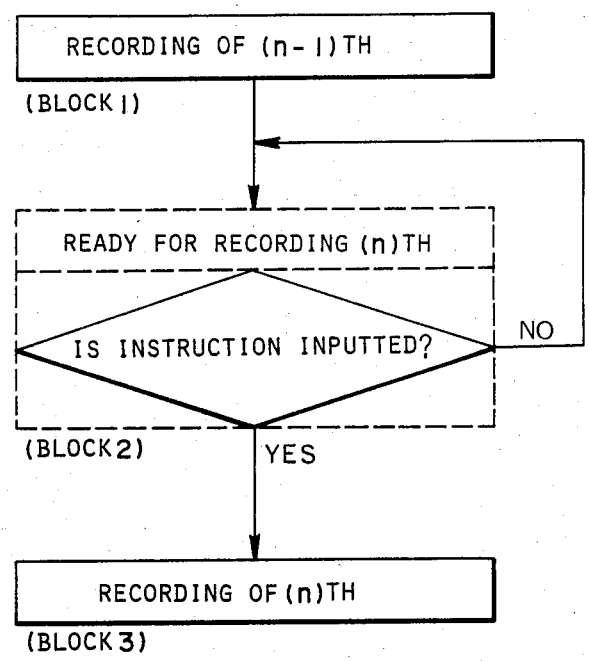
FIG. 3 is a flowchart of a process for recording reference spoken instructions in the prior-art system shown in FIG. 2.

FIG. 3 is a flowchart of the steps for recording spoken instructions in the prior-art speech recognition system shown in FIG. 2. In this flowchart, after an (n-1)th spoken instruction has been recorded in block 1, the system advances to block 2 and is ready to record the next (n)th spoken instruction; that is, the system determines whether or not the (n)th spoken instruction is supplied to the system. If the (n)th spoken instruction is not supplied to the system, the system stays in the state ready to record the (n)th spoken instruction; however, if the (n)th spoken instruction is supplied to the system, the system advances to block 3 and records the (n)th spoken instruction.

As described above, in the prior-art speech recognition system, the driver must record the spoken instructions in a predetermined sequence. If, however, the noise level in the passenger compartment is or becomes abnormally high while a spoken instruction is recorded, whereby the driver wants to re-record the spoken instruction, it is troublesome to utter the same spoken instructions repeatedly beginning from the first instruction, which was properly recorded.

Figure 4:
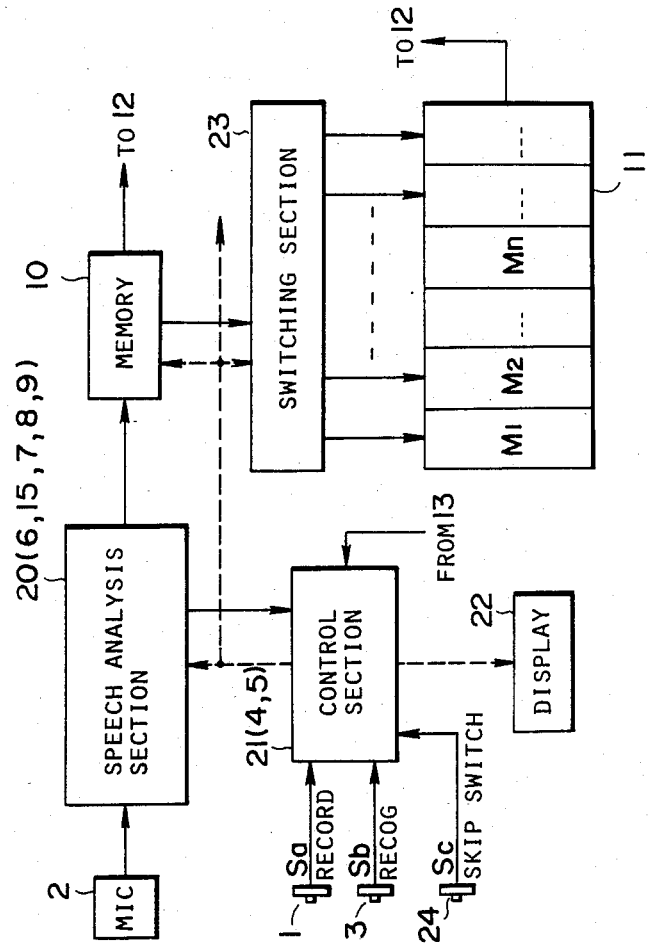
FIG. 4 is a fragmentary schematic block diagram of an essential portion of a first embodiment of the speech recognition system for an automotive vehicle according to the present invention.

FIG. 4 is a block diagram of a first embodiment of the speech recognition system according to the present invention wherein the prior-art system is modified to include skip switch 24, connected to control section 21.

When depressed, skip switch 24 supplies a skip signal $S_c$ to control section 21 which responds to the skip signal to supply a command signal to the display unit 22, the speech analysis section 20, and the switching section 23 in the same way as when a spoken instruction is supplied to the system by microphone 2 and stored in an appropriate storage area of the reference pattern memory 11. In other words, depression of skip switch 24 shifts the system from a ready state for recording the current spoken instruction to a ready state for recording the succeeding spoken instruction.

Figure 5:
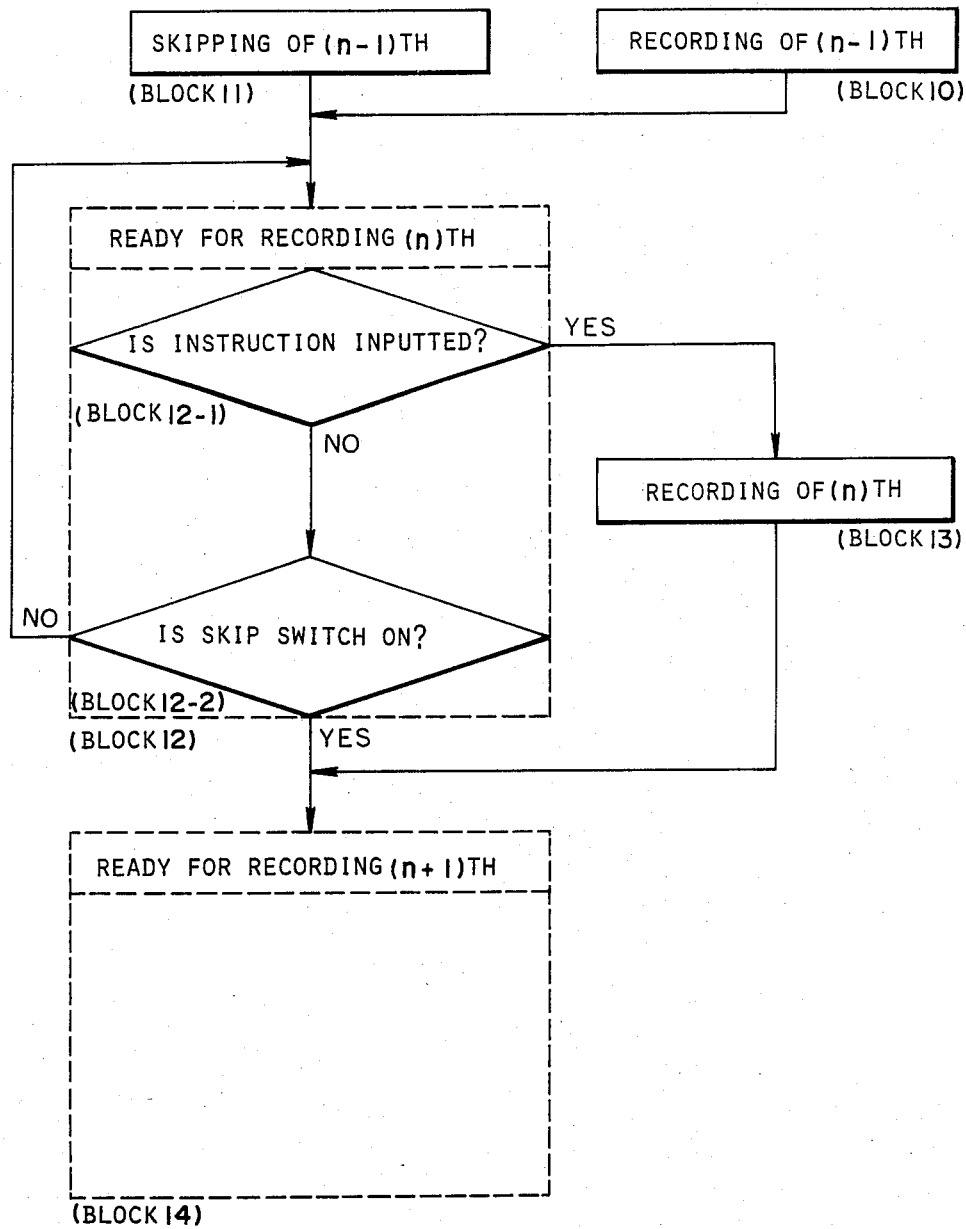
FIG. 5 is a flowchart of a process for recording reference spoken instructions in the speech recognition system for an automotive vehicle according to the present invention.

The operation of the first embodiment according to the present invention is now described with reference to the flowchart shown in FIG. 5.

When the driver depresses the record switch 1, the control section 21 supplies a command signal to the display unit 22, the speech analysis section 20, and the switching section 23. In response to this command signal, the first spoken instruction to be recorded is indicated on the display unit 22; the first storage area $M_1$ assigned for the first spoken instruction is connected to the memory unit 10 via the switching section 23; and the speech analysis section 20 is enabled to analyze and record the first spoken instruction expected to be transduced by microphone 2. Under these conditions, the first spoken instruction uttered by the driver and transduced by microphone 2 is analyzed by the speech analysis section 20 and stored in the storage area $M_1$ via memory unit 10 and switching section 23. After the first spoken instruction has been stored as described above, the control section 21 supplies the same command signal to each section in the same way as described above. In response to the command signal, the second spoken instruction is indicated on the display unit 22; a second storage area $M_2$ is connected to the memory unit 10 via the switching section 23; and the speech analysis section 20 is enabled to analyze and record the second spoken instruction. Under these conditions, when the driver utters the second spoken instruction, the second spoken instruction is analyzed and stored in the storage area $M_2$. Similarly, the remaining spoken instructions are all recorded in the assigned storage areas $M_n$ in predetermined sequence.

When the driver wants to record only the (n)th spoken instruction again, after all the spoken instructions have already been analyzed and recorded, because the (n)th spoken instruction was not properly recorded because, e.g., the noise level in the passenger compartment was abnormally high, the (n)th spoken instruction is re-recorded as follows:

When the record switch 1 is depressed, the system is activated to a ready state for recording the first spoken instruction. With the system in the ready state, the driver depresses the skip switch 24 causing signal $S_c$ to be supplied to control section 21; these operations are performed without uttering the first spoken instruction. In response to skip signal $S_c$, control section 21 supplies a command signal to display unit 22, speech analysis section 20, and switching section 23. As a result, the indication on the display unit 22 is switched from the first spoken instruction to the second spoken instruction; the second storage area $M_2$ is connected to the memory unit 10; and the speech analysis section 20 becomes ready for recording the second spoken instruction. In this state, when the driver depresses the skip switch 24 again, the ready state for recording the second spoken instruction is skipped similarly. Each time the driver depresses the skip switch 24, the indication on the display unit is renewed sequentially. Finally, the system advances to the (n)th spoken instruction, the spoken instruction required to be recorded again; the (n)th spoken instruction is indicated on the display unit 22. Thus, when the (n−1)th spoken instruction has been recorded in memory 10 or when the (n−1)th skip operation has been completed in memory 11, the system is activated to block 12, the ready state for recording the (n)th spoken instruction.

In block 12, the system first determines (in block 12-1) whether or not the (n)th spoken instruction is supplied to the system through microphone 2. If, however, the system determines that the (n)th spoken instruction is being supplied to the system, the system advances to block 13, causing the (n)th spoken instruction to be recorded. If the (n)th spoken instruction is not being supplied to the system, the system advances from block 12-1 to block 12-2 to determine whether or not the skip switch 24 is depressed. If switch 24 is not depressed, the system stays in the ready state to record the (n)th spoken instruction. If skip switch 24 is depressed, the system skips from block 12-2 to block 14, so it is in the ready state for recording the succeeding (n+1)th spoken instruction.

As described above, by depressing the skip switch 24 repeatedly, it is possible to skip the system to a ready state for freely recording any desired spoken instruction.

Figure 6:
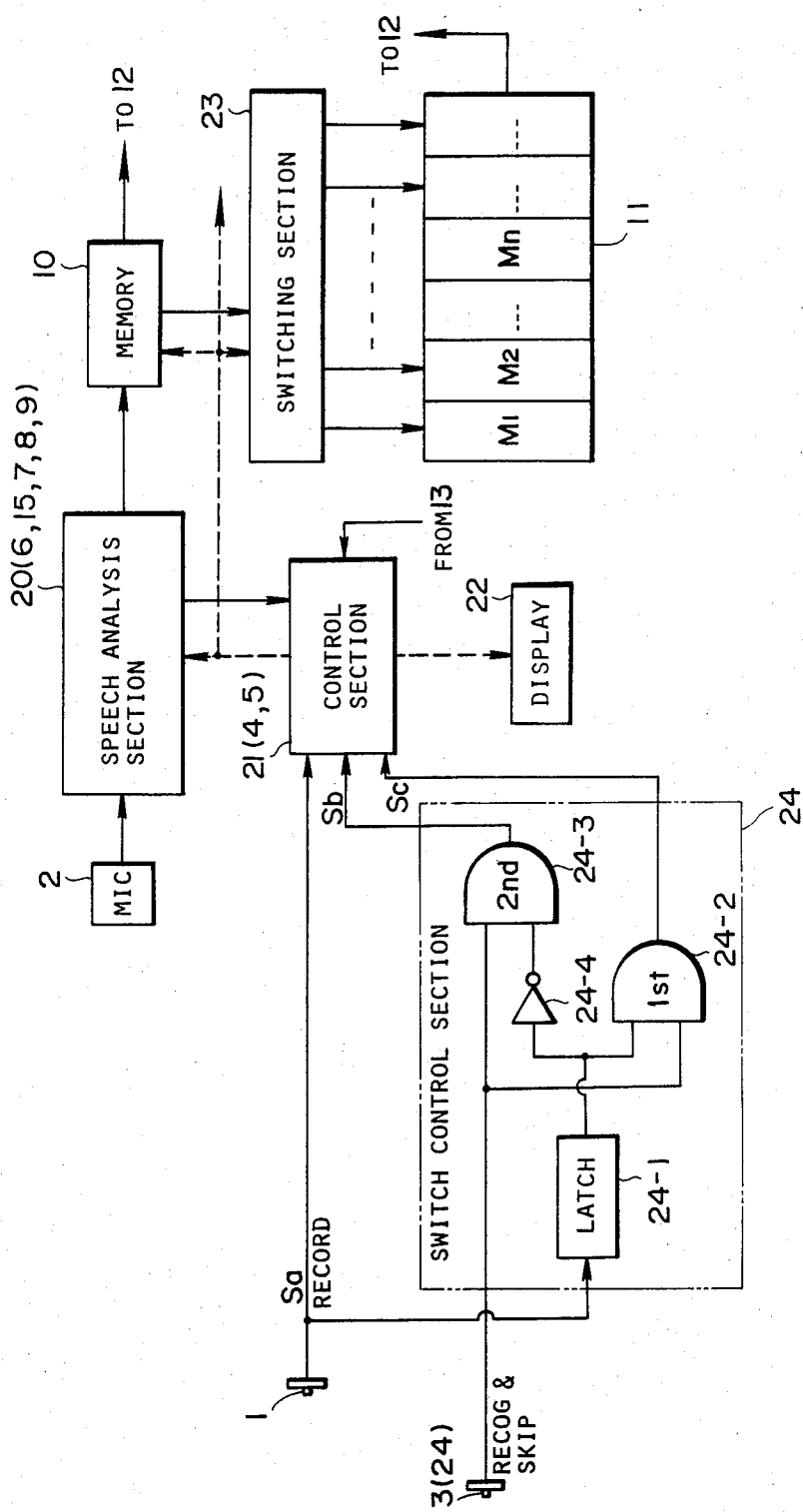
FIG. 6 is a fragmentary schematic block diagram of an essential portion of a second embodiment of the speech recognition system for an automotive vehicle according to the present invention.

FIG. 6 is a block diagram of a second embodiment according to the present invention wherein skip switch 24 is used in common with recognition switch 3. Switch control section 24, FIG. 6, includes a latch circuit 24-11, a first AND gate 24-2, a second AND gate 24-3, and an inverter 24-4. Section 24 switches the speech recognition system from the recognition mode to the skip instruction mode and vice versa in response to record signal $S_a$ being generated while record switch 1 is depressed and recognition signal $S_b$ is generated while recognition switch 3 is depressed.

When the record switch 1 is depressed, the record signal $S_a$ is directly applied to the control section 21 to set the entire system in the spoken instruction recording mode. That is, in response to derivation of recording signal $S_a$, the control section 21 supplies a command signal to the display unit 22, the speech analysis section 20, and the switching section 23, so that the system is in a ready state for recording a spoken instruction transduced by microphone 2. In this case, the recording signal $S_a$ activates the latch circuit 24-1, to cause the latch circuit to continuously derive a high logic voltage level signal.

When the recognition/skip switch 3(24) is additionally depressed to derive a high logic voltage level signal, both input terminals of AND gate 24-2 are at a high logic level, causing AND gate 24-2 to supply skip signal $S_c$ to the control section 21. The $S_c$ skip signal supplied to control section 24 causes section 24 to skip from the ready state for recording the current spoken instruction to the state for recording the succeeding spoken instruction. Thus, recognition/skip switch 3(24) serves as a skip switch, when both the switches 1 and 3 are depressed simultaneously.

On the other hand, when only the recognition skip switch 3(24) is depressed without record switch 1 having been depressed, latch circuit 24-1 derives a low logic voltage level signal, causing AND gate 24-2 to derive a low-voltage level signal; that is, skip signal $S_c$ is not generated. In this case, however, inverter 24-4 changes the low-voltage level signal at the output of latch circuit 24-1 to a high-voltage level signal, causing both input terminals of AND gate 24-3 to be at a high logic level. Thus, the second AND gate 24-3 supplies a recognition signal $S_b$ to the control section 21 to set the system to the spoken instruction recognition mode.

In summary, although each of record switch 1 and recognition switch 3 has its own separate function, simultaneous depression of recognition switch 3 and record switch 1 enables the current recording mode to skip to the succeeding recording mode. In this embodiment, since no additional skip switch 24 is required, it is possible to reduce the space where one switch is mounted.

With regard to the positions where switches 1 and 3(24) are mounted, since it is preferable for the driver to utter spoken instructions in the same seated posture in both the recording mode and the recognition mode, usually the record switch 1 is mounted on the center console (box) and the recognition/skip switch 3(24) is mounted on the steering wheel, in order to increase the recognition rate.

FIG. 7 is a block diagram of a third embodiment of a speed recognition system according to the present invention wherein switch control section 24, switching section 23, reference memory unit 11 and control section 21 (the essential sections or units in the present invention), are all incorporated within a microcomputer. Thus, all of the functions of the present invention are implemented via the operations executed by appropriate software, in place of hardware.

In the embodiment of FIG. 7, other elements or sections necessary for the speech recognizer 100 are all incorporated within the microcomputer 200, excluding the speech input interface 6, the switch input interface 4, and the bandpass filters 8 (it is also possible to incorporate these elements where necessary). Microcomputer 200 performs the same functions as performed by the discrete elements or sections in accordance with appropriate programs stored therein.

In the speech recognition system according to the present invention, the skip switch supplies a skip instruction signal $S_c$ for shifting from a ready state for recording the current spoken instruction to a ready state for recording the succeeding spoken instruction. It is thus possible, by depressing the skip switch repeatedly, to obtain readily the ready state for recording any given spoken instruction required to record once again; that is, it is possible to record again any given spoken instruction recorded when noise level is relatively high in the passenger compartment. As a result, it is possible to record the spoken instructions at a relatively higher recognition rate.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A speech recognition system for an automotive vehicle for activating vehicle actuators in response to predetermined spoken instructions supplied to the system via a microphone, which comprises:
    (a) a manually controlled record switch for deriving a record signal when activated;
    (b) a manually controlled recognition switch for deriving a recognition signal when activated;
    (c) a speech recognizer for sequentially recording a plurality of reference spoken instructions whenever one reference spoken instruction is supplied to the system through the microphone while said record switch is activated, a memory having a storage area for each spoken instruction, means for shifting access to each storage area for each spoken instruction has been recorded in the storage area provided therefore, means for activating a plurality of vehicle actuators sequentially whenever one recognition spoken instruction is supplied to the system via the microphone while said recognition switch is activated and when the spoken instruction to be recognized is similar to the reference spoken instruction; and
    (d) means for deriving skip instruction signal and for coupling the skip instruction signal to the speech recognizer to shift access from a currently accessed storage area for recording a current reference spoken instruction to a succeeding storage area for recording a succeeding reference spoken instruction even when the current reference spoken instruction is not supplied to the system through the microphone.

2. A speech recognition system for an automotive vehicle for activating actuators in response to predetermined spoken instructions supplied to the system via a microphone, the system comprising:
    (a) a manually operated record switch for deriving a record signal $S_a$ when activated;
    (b) a manually operated recognition switch for deriving a recognition signal $S_b$ when activated;
    (c) a speech anaylsis section connected to said microphone for analyzing the predetermined spoken instructions supplied via the microphone to the system and for deriving analyzed spoken instruction signals;
    (d) a memory unit connected to said speech anlysis section for temporarily storing the analyzed spoken instruction signals;
    (e) a reference pattern memory unit including plural storage areas $M_1$ and $M_n$ assigned for plural reference spoken instructions respectively;
    (f) a switching section connected to said memory unit and said reference pattern memory unit for connecting said memory unit to a first of the storage areas and for sequentially transferring analyzed reference spoken instruction signals stored in said memory unit to one of the storage areas in said reference pattern memory unit;
    (g) a control section connected to said speech analysis section and said switching section for supplying a command signal to said switching section for selecting the first stroage area in response to the record signal $S_a$ being derived and for supplying the same command signal to said switching section for selecting a succeeding one of said storage areas in response to the analyzed reference spoken information signals being stored in a preceding one of said storage areas; and
    (h) manually controlled means for selectively deriving a skip instruction signal $S_c$, said selective deriving means being connected to said control section, said control section supplying the same command signal to said switching section in response to the skip instruction signal $S_c$ for selecting the succeeding storage area even when the current reference spoken instruction is not supplied to the system via microphone.

3. The automotive speech recognition system for a vehicle as set forth in claim 1, wherein said means for deriving a skip instruction $S_c$ includes a manually activated switch which when activated is connected to energize said speech recognizer to cause access to a currently accessed storage area to be incrementally shifted to the succeeding storage area, even when the current reference spoken instruction is not supplied to the system through the microphone.

4. The speech recognition system for an automotive vehicle as set forth in claim 1 wherein said means for deriving a skip instruction signal $S_c$ comprises:
    (a) a latch circuit connected to said record switch for deriving a H-voltage level signal in response to derivation of the record signal $S_a$;
    (b) a first AND gate having first and second input terminals respectively connected to respond to an output of said latch circuit and to an output of said recognition switch, said first AND gate deriving a H-voltage level skip instruction signal $S_c$ in response to said record switch and said recognition switch being activated simultaneously;
    (c) an inverter connected to said latch circuit; and
    (d) a second AND gate having first and second input terminals respectively connected to respond to an output of said recognition switch and an output of said inverter for deriving a recognition signal $S_b$ in response to said recognition switch being activated while said record switch is not activated.

5. A speech recognition system for an automotive vehicle for activating vehicle actuators in response to predetermined spoken instructions supplied to the system via a microphone, the system comprising:
    (a) a record switch for deriving a record signal $S_a$ when activated;
    (b) a recognition switch for deriving a recognition signal $S_b$ when activated; and
    (c) a microcomputer connected to said record switch and said recognition switch, said microcomputer;
        (1) analyzing the predetermined reference spoken instructions supplied to the system through the microphone,
        (2) temporarily storing the analyzed reference spoken instruction signals;
        (3) shifting access from a currently accessed storage area to a succeeding storage area in response to simultaneous derivation of both of the recording signal $S_a$ and the recognition signal $S_b$ even when the current reference spoken instruction is not supplied to the system via microphone; and
        (4) transferring the stored reference spoken instruction signals to a first storage area in response to derivation of the recording signal $S_a$ and to the succeeding stroage area whenever analyzed reference spoken instruction signals have been stored in a preceding storage area.

6. The speech recognition system for an automotive vehicle as set forth in claim 1 which further comprises a display unit for indicating some instructions thereon appropriate to the case where a plurality of reference spoken instructions are recorded in a predetermined sequence.

7. A method of loading signals representing N predetermined uttered phrase to be recognized by a speech recognition system into a memory of the system, the memory initially including N command signals indicative of N uttered phrases to be stored in the memory in response to N phrases to be uttered by an operator, the system, when operating, comparing signals representing phrases uttered by the operator with the signals stored in the memory representing the N phrases to be uttered and deriving one of N signals to indicate which one, if any, of the stored signals representing the N phrases correlates with the phrase uttered by the operator, the loading method comprising:

(a) activating the system to sequentially read out the N command signals to the operator to sequentially provided the operator with N instructions as to the phrases he is to utter, the operator responding to the N instructions by sequentially uttering N phrases, each uttered phrase being associated with one of the commands;

(b) the system sequentially responding to each phrase sequentially uttered by the operator in response to the N instructions by deriving a separate signal for each uttered phrase and sequentially storing each separate signal in a separate memory location, (c) the operator then supplying an input signal to the system to command skipping of the sequential storing of the separate signals at the separate memory locations without uttering phrases from memory locations 1 . . . (K-1) in the event of the operator wanting to re-record the spoken instructions at locations 1 . . . (K-1), where K is any integer greater than 1 and no greater than N, the system responding to the skipping command input signal to cause the memory to skip over and have no effect on instructions stored at memory locations 1 . . . (K-1) and to advance the memory to memory location K, the system supplying the command signal for memory location K to the operator when the memory is advanced to memory location K, the system responding to a phrase uttered by the operator while the memory is at memory location K by replacing the signal previously stored at memory location K with a signal indicative of the uttered phrase while the memory is accessed to memory location K.

8. The method of claim 7 wherein the operator causes a separate input signal to be supplied to the system to command skipping of memory locations 1 . . . (K-1) without uttering a phrase, the system responding to the separate input signals to sequentially skip memory locations 1 . . . (K-1), the system responding to each input separate signal to provide the operator with a separate instruction corresponding to each of the separate skipped memory locations.

9. A speech recognition system comprising a memory, means for initially loading the memory with N stored signals indicative of N phrases uttered by an operator while the system is in a recording mode, means operative while the system is in a recognition mode for comparing signals representing phrases uttered by the operator with the signals stored in the memory representing the N uttered phrases and for deriving one of N signals to indicate which one, if any, of the stored signal representing the N stored phrases correlates with the phrase uttered by the operator, indicator means for indicating to the operator that one of the N memory locations is ready to be loaded while the system is in the record mode, the means for loading including:

(a) means for sequentially reading out the N command signals to the operator to sequentially provided the operator with N instructions as to the phrases he is to utter, the operator responding to the N instructions by sequentially uttering N phrases, each uttered phrase being associated with one of the commands;

(b) means sequentially responsive to each phrase sequentially uttered by the operator in response to the N instructions for deriving a separate signal for each uttered phrase and for sequentially storing each separate signal in a separate memory location, means responsive to an operator operation indicating that the operator wants to re-record a spoken instruction at memory location K without re-recording the spoken instructions at locations 1 . . . (K-1), where K is any integer greater than 1 and no greater than N, skipping by the sequential storing of the separate signals at the separate memory locations 1 . . . (K-1) operator does not phrases for memory locations 1 . . . (K-1) in the event of and have no effect on instructions stored at memory locations 1 . . . (K-1) and to advance the memory to memory location K, means for supplying the indicator means with a command signal for memory location K in response to the memory being advanced to memory location K after having skipped memory locations 1 . . . (K-1), means responsive to a phrase uttered by the operator while the memory is at memory location K for replacing the signal. previously stored at memory location K with a signal indicative of the uttered phrase while the memory is accessed to memory location K.

10. The automotive speech recognition system for a vehicle as set forth in claim 2 wherein said means for deriving a skip instruction $S_c$ includes a manually activated switch which when activated is connected to energize said speech recognizer to cause access to a currently accessed storage area to be incrementally shifted to the succeeding storage area, even when the current reference spoken instruction is not supplied to the system through the microphone.

11. The speech recognition system for an automotive vehicle as set forth in claim 2 wherein said means for deriving a skip instruction signal $S_c$ comprises:

(a) a latch circuit connected to said record switch for deriving a H-voltage level signal in response to derivation of the record signal $S_a$;

(b) a first AND gate having first and second input terminals respectively connected to respond to an output of said latch circuit and to an output of said recognition switch, said first AND gate deriving a H-voltage level skip instruction signal $S_c$ in response to said record switch and said recognition switch being activated simultaneously;

(c) an inverter connected to said latch circuit; and (d) a second AND gate having first and second input terminals respectively connected to respond to an output of said recognition switch and an output of said inverter for deriving a recognition signal $S_b$ in response to said recognition switch being activated while said record switch is not activated.

12. The speech recognition system for an automotive vehicle as set forth in claim 2 which further comprises a display unit for indicating some instructions thereon appropriate to the case where a plurality of reference spoken instructions are recorded in a predetermined sequence.

13. The speech recognition system for an automotive vehicle as set forth in claim 5 which further comprises a display unit for indicating some instructions thereon appropriate to the case where a plurality of reference spoken instructions are recorded in a predetermined sequence.

* * * * *